US008977856B2

(12) United States Patent
Malek et al.

(10) Patent No.: US 8,977,856 B2
(45) Date of Patent: Mar. 10, 2015

(54) METHODS AND APPARATUS FOR USE IN SHARING CREDENTIALS AMONGST A PLURALITY OF MOBILE COMMUNICATION DEVICES

(75) Inventors: Rafal Malek, Orleans (CA); Christophe Gustave, Ottawa (CA); Edwin J. Feener, Kanata (CA); Kyung Mo Beak, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 111 days.

(21) Appl. No.: 13/601,471

(22) Filed: Aug. 31, 2012

(65) Prior Publication Data
US 2014/0068261 A1 Mar. 6, 2014

(51) Int. Cl.
*H04L 29/06* (2006.01)

(52) U.S. Cl.
USPC .......................................... 713/171

(58) Field of Classification Search
CPC ........ H04L 2209/60; H04L 9/14; H04L 9/321
USPC ................................. 713/168, 171
See application file for complete search history.

(56) References Cited

U.S. PATENT DOCUMENTS

| 5,818,936 | A | 10/1998 | Mashayekhi |
| 7,333,615 | B1 | 2/2008 | Jarboe et al. |
| 7,395,436 | B1 | 7/2008 | Nemovicher |
| 2001/0034714 | A1* | 10/2001 | Terao et al. .................. 705/57 |
| 2002/0073143 | A1* | 6/2002 | Edwards et al. .............. 709/203 |
| 2002/0085540 | A1 | 7/2002 | Hyvarinen et al. |
| 2003/0005290 | A1* | 1/2003 | Fishman et al. .............. 713/156 |
| 2004/0062400 | A1 | 4/2004 | Sovio et al. |
| 2004/0073785 | A1* | 4/2004 | Hurtta et al. .................. 713/155 |
| 2004/0171374 | A1* | 9/2004 | Little et al. ................... 455/418 |
| 2004/0193925 | A1 | 9/2004 | Safriel |

(Continued)

FOREIGN PATENT DOCUMENTS

| WO | 2005088932 A1 | 9/2005 |
| WO | 2011109865 A1 | 9/2011 |

(Continued)

OTHER PUBLICATIONS

Ambarish Karole et al., "A Comparative Usability Evaluation of Traditional Password Managers", Dec. 1, 2010, pp. 233-251, Information Security and Cryptology—ICISC 2010, Springer Berlin Heidelberg, Berlin, Heidelberg, XP019163091.

(Continued)

*Primary Examiner* — Bradley Holder
(74) *Attorney, Agent, or Firm* — Perry + Currier, Inc.

(57) ABSTRACT

Techniques for use in sharing a plurality of credential objects of a user account amongst a plurality of mobile devices operative in a wireless network are described. In one illustrative example, a network infrastructure (e.g. a cloud) stores a plurality of encrypted credential objects in association with the user account. Each encrypted credential object is encrypted with a credential key. The network infrastructure also stores a plurality of encrypted forms of the credential key in association with the user account. Each encrypted form of the credential key is encrypted with a respective one of a plurality of device keys. Each device key is stored at respective one of the mobile devices. The network infrastructure provides, to the mobile devices, access to the encrypted credential key and the encrypted credential objects.

16 Claims, 7 Drawing Sheets

(56) References Cited

U.S. PATENT DOCUMENTS

| | | |
|---|---|---|
| 2005/0148323 A1* | 7/2005 | Little et al. ............... 455/414.1 |
| 2005/0154890 A1 | 7/2005 | Vembu |
| 2005/0251491 A1 | 11/2005 | Medina et al. |
| 2007/0047735 A1 | 3/2007 | Celli et al. |
| 2008/0118059 A1* | 5/2008 | Shenfield et al. ............... 380/44 |
| 2008/0126797 A1* | 5/2008 | Kim et al. ................... 713/155 |
| 2008/0208688 A1* | 8/2008 | Byerley et al. ................. 705/14 |
| 2008/0307068 A1* | 12/2008 | Willey et al. ................ 709/218 |
| 2008/0307234 A1* | 12/2008 | Salowey et al. ............. 713/182 |
| 2008/0313741 A1* | 12/2008 | Alve et al. ...................... 726/26 |
| 2009/0158032 A1* | 6/2009 | Costa et al. ................. 713/156 |
| 2009/0164804 A1* | 6/2009 | Mardiks et al. .............. 713/193 |
| 2010/0211781 A1 | 8/2010 | Auradkar et al. |
| 2010/0266132 A1 | 10/2010 | Bablani et al. |
| 2010/0306546 A1* | 12/2010 | Willey et al. .................. 713/175 |
| 2011/0072270 A1* | 3/2011 | Little et al. .................... 713/175 |
| 2011/0225640 A1 | 9/2011 | Ganapathy et al. |
| 2011/0246766 A1 | 10/2011 | Orsini et al. |
| 2011/0271331 A1* | 11/2011 | Adams ............................. 726/6 |
| 2012/0173625 A1* | 7/2012 | Berger ......................... 709/204 |

FOREIGN PATENT DOCUMENTS

| | | |
|---|---|---|
| WO | 2012042300 A1 | 4/2012 |
| WO | 2012052806 A1 | 4/2012 |

OTHER PUBLICATIONS

European Search Report for EP Patent Application # 12182678.8—1853, Feb. 13, 2013.

* cited by examiner

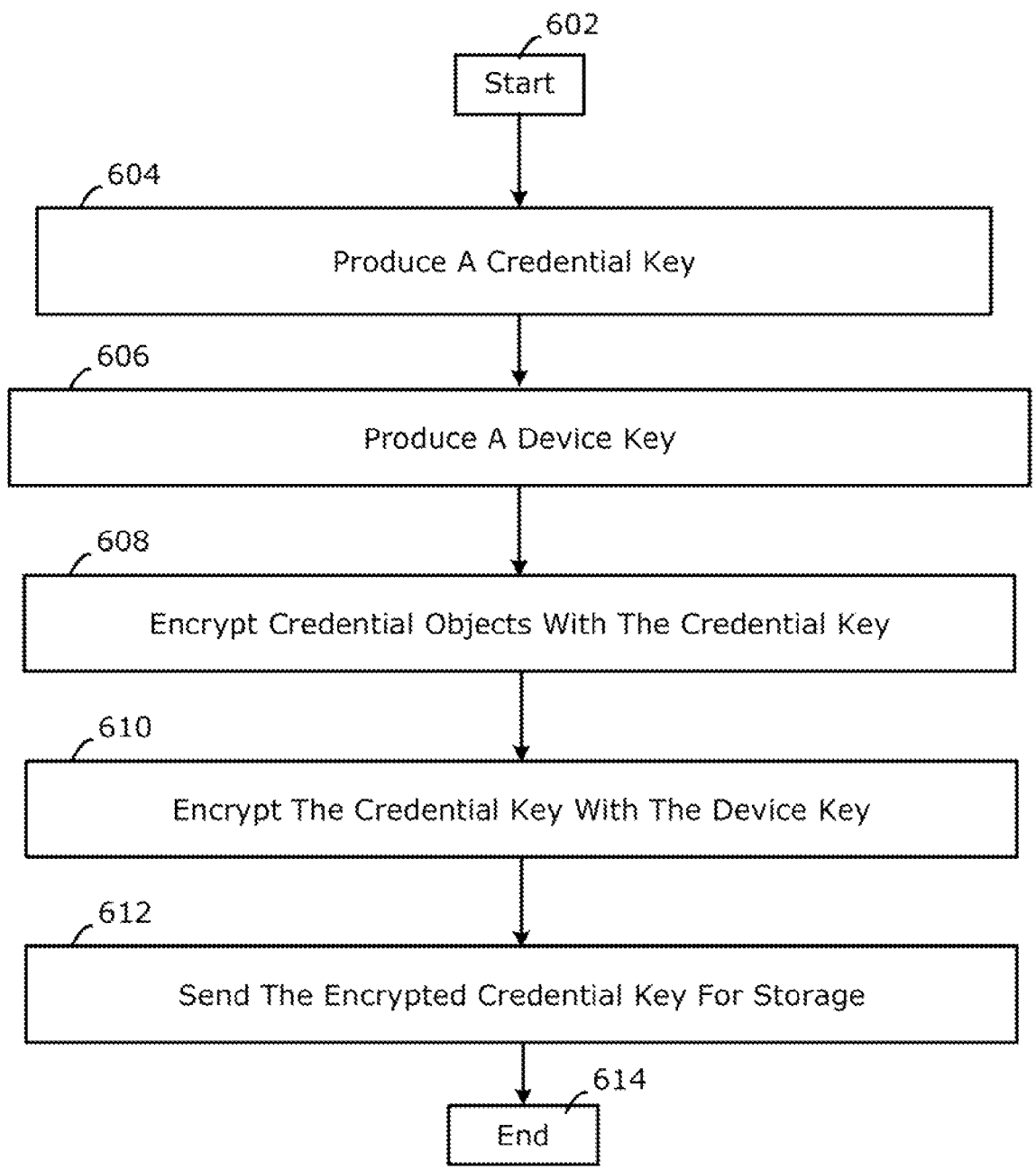

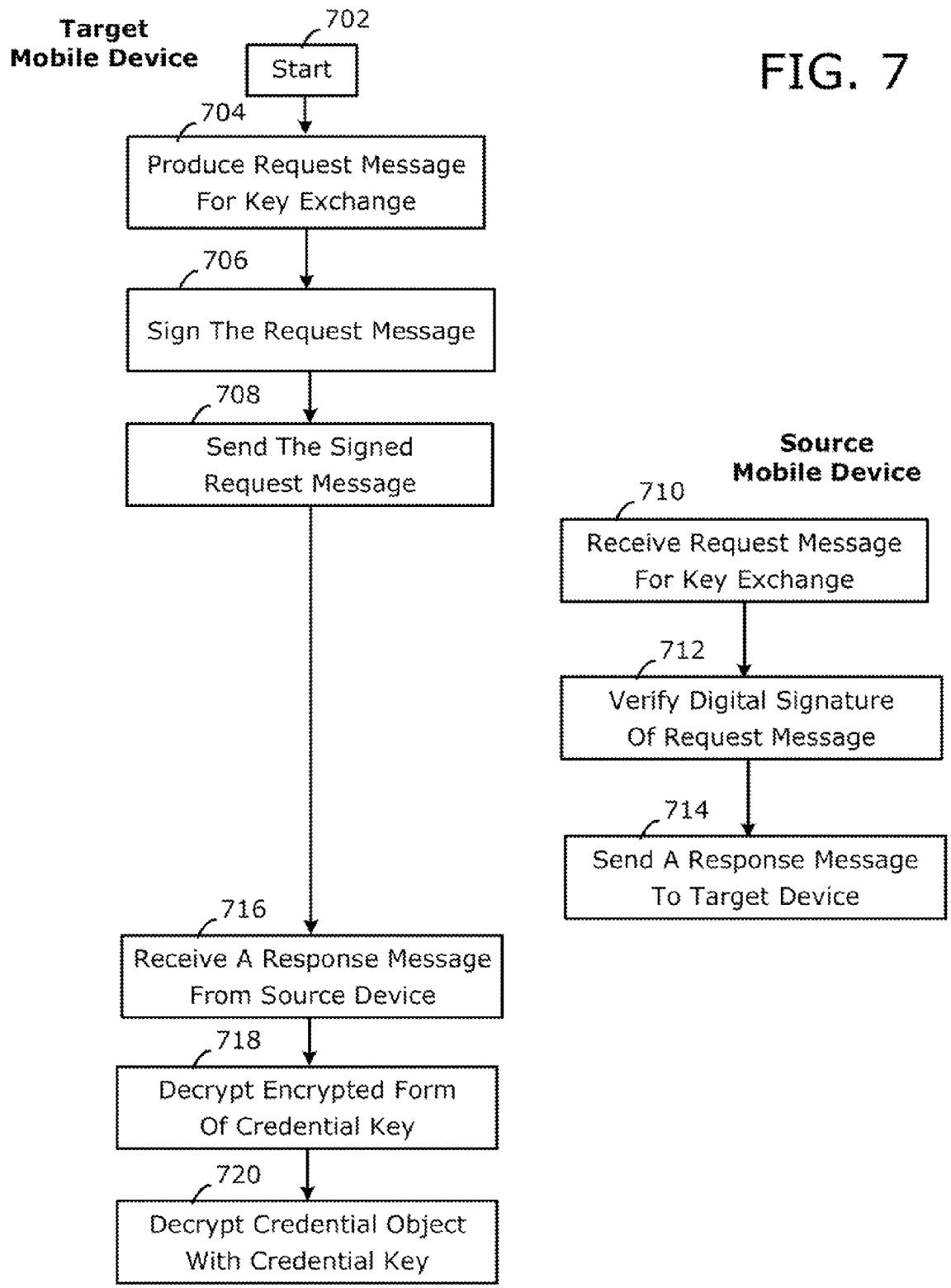

METHODS AND APPARATUS FOR USE IN SHARING CREDENTIALS AMONGST A PLURALITY OF MOBILE COMMUNICATION DEVICES

BACKGROUND

1. Field of the Technology

The present disclosure relates generally to the sharing of credentials amongst a plurality of mobile communication devices operative for wireless communications in a wireless communication network.

2. Description of the Related Art

A mobile communication device, such as a portable wireless telephony device or a smartphone, is configured to communicate in wireless communication networks. For example, such a device may communicate in cellular telecommunications networks and/or wireless local area networks (WLANs).

Such a device may utilize a number of different data applications (e.g. social networking applications such as Facebook, Twitter, etc., or other applications having confirmed purchases). Each of these applications may require different credentials for access. Also, a user may own or operate more than one mobile device and wish to share these credentials amongst all of the mobile devices.

BRIEF DESCRIPTION OF THE DRAWINGS

Embodiments of present disclosure will now be described by way of example with reference to attached figures, wherein:

FIG. 6 is a flowchart for a method for use in initially establishing a shared use of a plurality of credential objects of a user account amongst one or more mobile devices operative in a wireless network; and FIG. 7 is a flowchart for a method in a target mobile device for obtaining a credential key from a source mobile device, and correspondingly a method in a source mobile device for obtaining a credential key from a target mobile device.

DETAILED DESCRIPTION OF THE EMBODIMENTS

Techniques for use in sharing a plurality of credential objects of a user account amongst a plurality of mobile devices operative in a wireless network are described herein. A network infrastructure stores a plurality of encrypted credential objects in association with the user account. Each encrypted credential object is encrypted with a credential key. The network infrastructure also stores a plurality of encrypted forms of the credential key in association with the user account. Each encrypted form of the credential key is encrypted with a respective one of a plurality of device keys. Each device key is different from every other device key, and each encrypted form of the credential key is different from every other encrypted form of the credential key. Each device key is stored at a respective one of the mobile devices. The network infrastructure provides to the mobile devices access to the encrypted credential key and the encrypted credential objects. Each mobile device decrypts one of the encrypted forms of the credential key with a stored device key, so that the mobile device may decrypt the encrypted credential objects with the credential key.

For initially establishing such a shared credentials environment, a mobile device may operate as follows. The mobile device generates the credential key associated with the user account, which is utilized to encrypt the credential objects. The mobile device also generates a device key. The mobile device encrypts the credential key with its device key. The mobile device may send the encrypted credential key for storage in association with the user account.

An additional mobile device may be added on for sharing such credentials. A target mobile device produces a request message for a key exchange, where the request message includes a target identifier which identifies the target mobile device and a target device key generated by the target mobile device. The target mobile device signs the request message with a digital signature. The target mobile device sends the signed request message to a source mobile device. If the request message is positively verified, the target mobile device receives a response message from the source mobile device. The response message includes the target identifier and an encrypted form of the credential key. The encrypted form of the credential key is encrypted with the target device key. The target mobile device is then able to decrypt the encrypted form of the credential key with the target device key for producing the credential key, and then receive and decrypt the credential objects with the credential key.

Figure 1:
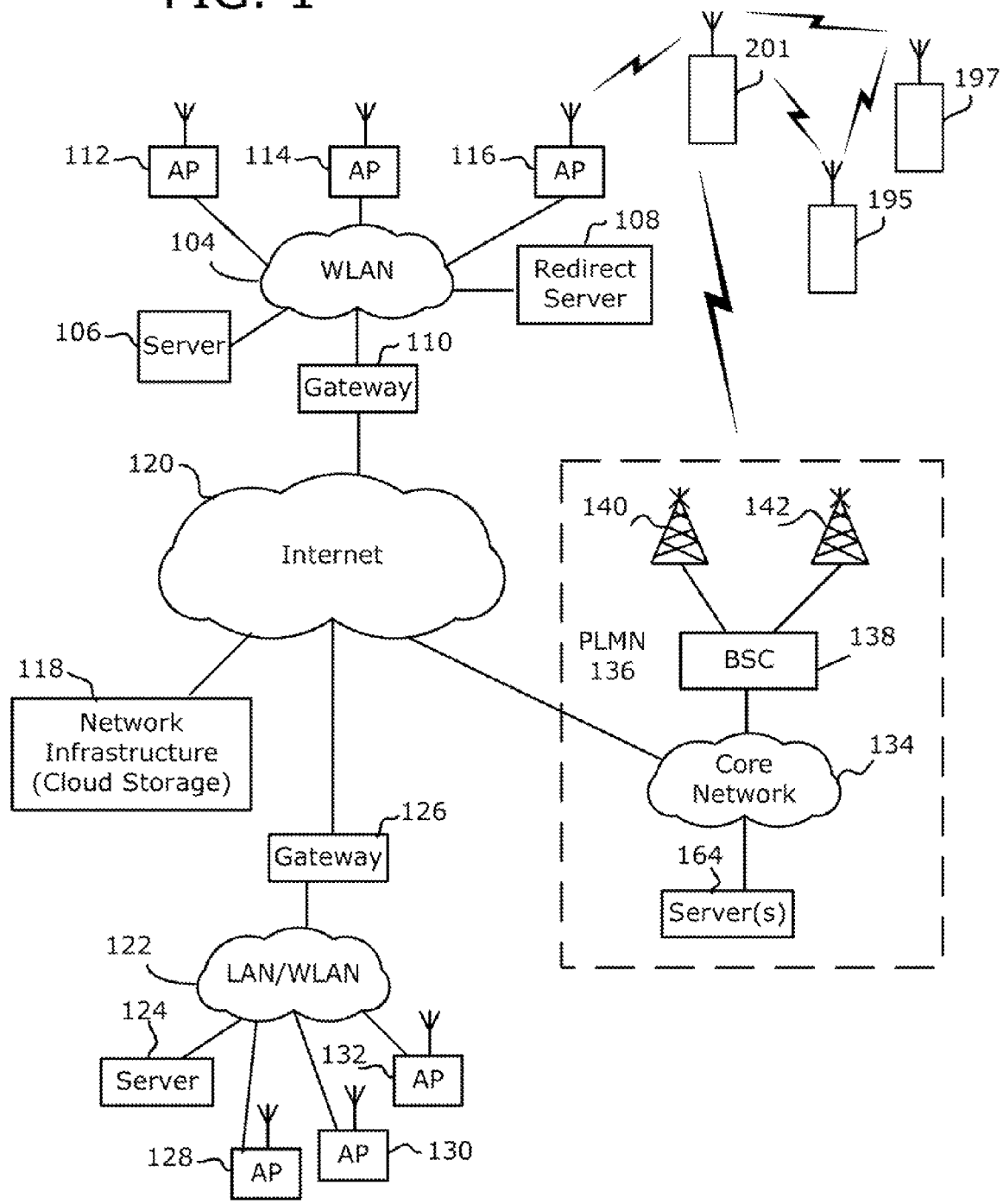
FIG. 1 is an illustrative representation of a communication system which includes wireless communication networks (e.g. WLANs) with which a wireless communication device may communicate.

Example Environment. To illustrate one environment within which the techniques of the present disclosure may be practiced, FIG. 1 illustrates a mobile communication device 201 which may communicate in a communication system 100. In the communication system 100, mobile device 201 may communicate with one or more wireless communication networks. For example, mobile device 201 may communicate with a wireless communication network 104 comprising a wireless local area network (WLAN). Here, wireless network 104 and mobile device 201 may operate in accordance with IEEE 802.11 standards.

In this example, wireless network 104 has a plurality of wireless access points (APs) 112, 114, and 116 for wireless communications with mobile device 201. WLANs may be identified by a mobile device 201 with use of a wireless network identifier which is communicated from the WLAN. The wireless network identifier may be, for example, a Set Service Identifier (SSID) or Extended SSID (ESSID). In this example, wireless network 104 includes one or more servers 106, a redirect server 108, and a gateway 110. Server 106 may provide data, applications, and/or functionality for communication services for mobile device 201.

Wireless network 104 may comprise a public Wi-Fi "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to mobile device 201 to provide data for producing information (e.g. Web page information) which is rendered in a visual display of mobile device 201 via a Web browser application. The information may solicit a user response. For example, the information may solicit a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Mobile device 201 may also operate for communications in other different wireless networks, such as a wireless network 122 comprising a WLAN. In this example, wireless network 122 comprises a private communication network of an enterprise (e.g. an organization, a company, a corporation, etc.) of mobile device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120 gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, mobile device 201 may be enabled to maintain data synchronization with a server for user data of an application associated with a user account. The application of mobile device 201 and the server may be or include, for example, an electronic mail (e-mail) application program for the communication of e-mail messages.

Mobile device 201 may be additionally configured to access communication services via a Public Land Wireless Network (PLMN) 135 136 (e.g. a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, mobile device 201 may be configured in accordance with one or more cellular telecommunication standards, such as Global Systems for Mobile (GSM) and/or General Packet Radio Service (GPRS) technologies. However, such mobile device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Further, in additional to being operative for communications with infrastructure WLANs (e.g. IEEE 802.11 infrastructure WLANs), mobile device 201 may additionally or alternatively communicate using peer-to-peer communication techniques, for example, in accordance with the Wi-Fi Peer-To-Peer (P2P) Technical specification, and/or be certified as a "Wi-Fi Direct" device. The Wi-Fi Peer-To-Peer (P2P) Technical specification is hereby incorporated by reference herein.

Accordingly, illustrated further in FIG. 1, a user of mobile device 201 may use one or more other mobile devices 195 and 197 in FIG. 1. Mobile devices 201, 195, 197 may be operative to communicate over short range wireless links. For example, the devices may establish Wi-Fi P2P wireless network connections with each other in a Wi-Fi P2P wireless network. Here, one of the communication devices may be configured to enter into an AP mode of operation, so that other communication devices may associate with them for direct RF communications therebetween. An AP mode of operation, which may be referred to as a "wireless AP mode" or the like, provides a benefit due to the high data rates available over WLAN links. Here, again, data may be communicated directly between the mobile devices without the data traversing any wireless network infrastructure, where one of the devices is set to operate or serve as an AP (switching operation from as an end terminal) and the other device operates as an end terminal to associate and connect with the AP (i.e. mobile device 201 operating as an AP) for communications. Mobile device 201 may operate such that, when in the AP mode of operation with other communication devices 195 and 197, it also operates as a client with another AP.

Mobile device 201 (as well as other mobile devices 195 and 197 of the same user) may operate to access a network infrastructure 118. Network infrastructure 118 stores a plurality of credentials associated with a user account of the user. Network infrastructure 118 includes one or more servers and/or databases (e.g. memory) for the storage of user data. Such network infrastructure for remote storage may be referred to as "the cloud".

In the present disclosure, network infrastructure 118 stores a plurality of encrypted credential objects in association with the user account. Each encrypted credential object is encrypted in accordance with a credential key. Network infrastructure 118 also stores a plurality of encrypted forms of the credential key in association with the user account. Each encrypted form of the credential key is encrypted with one of a plurality of device keys. Each device key is stored at one of the mobile devices 201, 195, 197. Network infrastructure 118 provides to the mobile devices access to the encrypted credential key and the encrypted credential objects. Each mobile device decrypts one of the encrypted forms of the credential key with a stored device key, so that the mobile device may decrypt the encrypted credential objects with the credential key.

Figure 2:
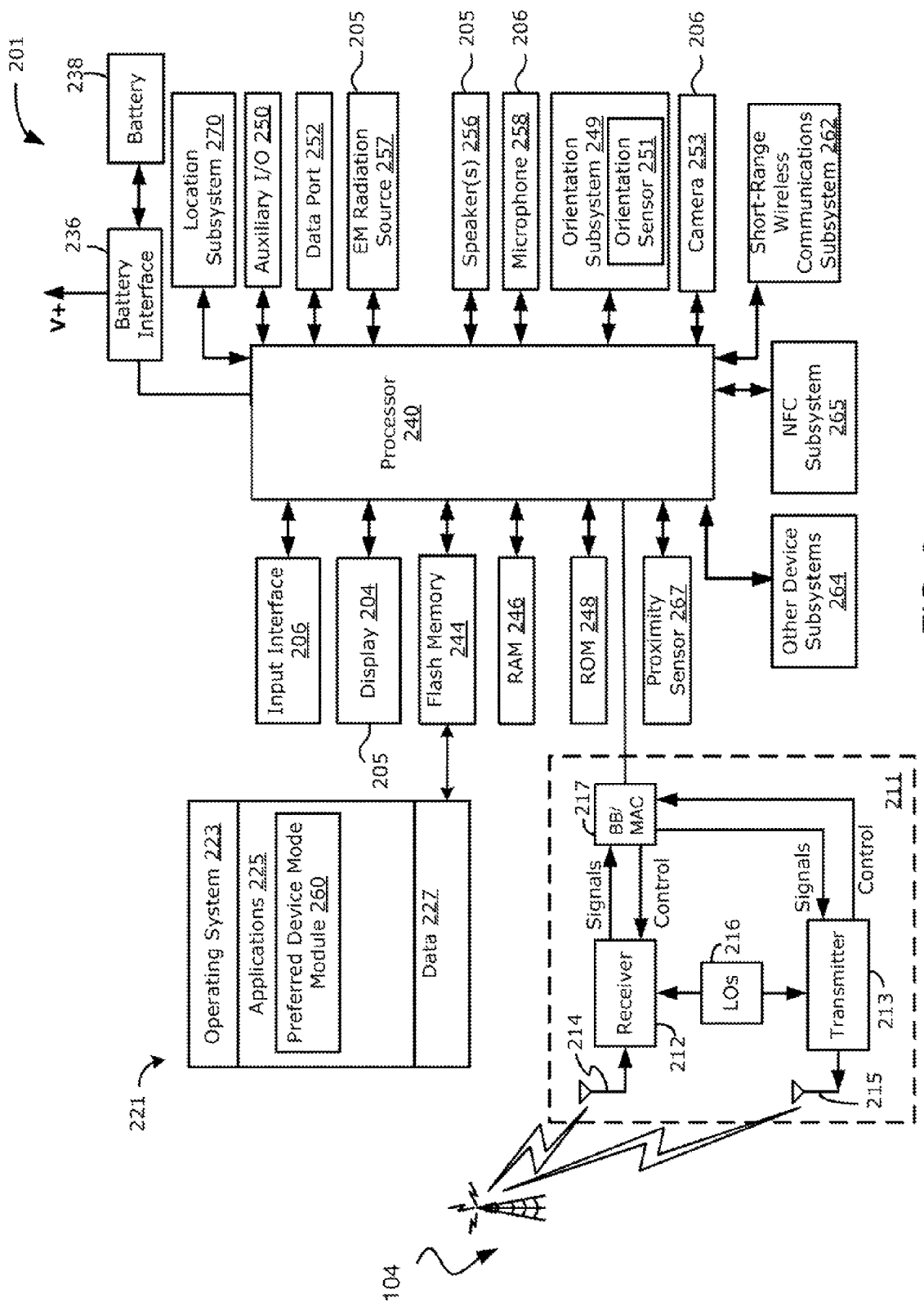
FIG. 2 is an example of a schematic block diagram of the mobile device of FIG. 1.

Reference will now be made to FIG. 2 which illustrates one example of a schematic block diagram of mobile device 201 in which example embodiments may be applied. In the illustrated example embodiment, mobile device 201 comprises a communication device and, more particularly, comprises a mobile communication device having data and voice communication capabilities, and configured to communicate with other computer systems (e.g. via the Internet). It will, however, be appreciated that mobile device 201 may take other forms. In some embodiments, mobile device 201 has data communication capabilities, and voice communication capabilities are optional.

Depending on the functionality provided by mobile device 201, in various example embodiments mobile device 201 may comprise a multiple-mode communication device configured for both data and voice communication, a mobile telephone, such as a smartphone, a wearable computer such as a watch, a tablet computer such as a slate computer, a personal digital assistant (PDA), or a computer system. Other examples of mobile device 201 include portable gaming devices, portable media players, and e-book readers. Mobile device 201 may take other forms apart from those specifically listed above. The electronic device may also be referred to as a mobile communications device, a communication device, a mobile device and, in some cases, as a device.

Mobile device 201 includes a controller including one or more processor 240 (such as a microprocessor) which controls the overall operation of mobile device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch-screen display 204, an orientation subsystem 249, memory (such as flash memory 244, random access memory (RAM) 246, read only memory (ROM) 248, etc.), auxiliary input/output (I/O) subsystems 250, a data port 252 (which may comprise a serial data port, such as a Universal Serial Bus (USB) data port), a near field communications (NFC) subsystem 265, a short-range communication subsystem 262 and other device subsystems generally designated as 264. Some of the subsystems shown in FIG. 2 perform communication-related functions, whereas other subsystems may provide "resident" or on-device functions.

In at least some example embodiments, mobile device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (of FIG. 3A) which surrounds the display 204. In such example embodiments, the frame 312 (of FIG. 3A) may be referred to as an active frame since it is capable of acting as an input interface 206. In at least some example embodiments, the touch-sensitive overlay may extend to the sides of mobile device 201.

As noted above, in some example embodiments, mobile device 201 may include a communication subsystem 211 which allows mobile device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to mobile device 201 and a single antenna may be shared by both receiver and transmitter. The particular design of the wireless communication subsystem 211 depends on wireless network 104 in which mobile device 201 is intended to operate.

In at least some example embodiments, mobile device 201 may communicate with any one of a plurality of stations or access points (APs) of wireless network 104 within its geographic coverage area. Mobile device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. Mobile device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on mobile device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of mobile device 201 by providing for information or software downloads to mobile device 201 other than through wireless network 104. The alternate download path may for example, be used to load an encryption key onto mobile device 201 through a direct, reliable and trusted connection to thereby provide secure device communication.

In at least some example embodiments, mobile device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 comprises an accelerometer, such as a three-axis accelerometer. An accelerometer generally comprises a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of mobile device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

Mobile device 201 may, in at least some example embodiments, include a near field communications (NFC) subsystem 265. The NFC subsystem 265 is configured to communicate with other mobile devices 201, readers, and/or tags, using an NFC communications protocol. NFC generally includes a set of short-range wireless technologies which may require a close proximity such as a distance of 4 cm or less for communications, although the requirements may vary depending on the particular implementation. The NFC subsystem 265 may include an NFC chip and an NFC antenna.

Mobile device 201 may include a microphone and/or one or more speakers. In at least some example embodiments, mobile device 201 may include a plurality of speakers 256. For example, in some example embodiments, mobile device 201 may include two or more speakers 265. The two or more speakers 256 may, for example, be disposed in spaced relation to one another. That is, in at least some example embodiments, mobile device 201 may include a first speaker and a second speaker and the first speaker and the second speaker may be spatially separated from one another within mobile device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some example embodiments, each speaker 256 may be associated with a separate audio channel. The multiple speakers may, for example, be used to provide stereophonic sound (which may also be referred to as stereo).

Mobile device 201 may also include one or more cameras 253. The one or more cameras 253 may be capable of capturing images in the form of still photographs or motion video. In at least some example embodiments, mobile device 201 includes a front facing camera 253. A front facing camera generally refers to a camera which is generally located on a front face of mobile device 201. The front face is typically the face on which a display 204 is mounted. That is, the display 204 is configured to display content which may be viewed from a side of mobile device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of mobile device 201 and/or the housing of mobile device 201. In such example embodiments, the direction of capture of the camera is generally predictable relative to the display 204 and/or the housing. In at least some example embodiments, the camera may be provided in a central location relative to the display 204 to facilitate image acquisition of a face. In some embodiments, the one or more cameras 253 includes a rear facing camera. The rear facing camera may be in addition to or instead of the front-facing camera.

In at least some example embodiments, mobile device 201 includes an electromagnetic (EM) radiation source 257. In at least some example embodiments, the EM radiation source 257 is configured to emit electromagnetic radiation from the side of the electronic device which is associated with a camera 253 of that mobile device 201. For example, where the camera comprises a front facing camera 253, mobile device 201 may be configured to emit electromagnetic radiation from the front face of mobile device 201. That is, in at least some example embodiments, the electromagnetic radiation source 257 is configured to emit radiation in a direction which may visible by the camera. That is, the camera 253 and the electromagnetic radiation source 257 may be disposed on mobile device 201 so that electromagnetic radiation emitted by the electromagnetic radiation source 257 is visible in images obtained by the camera.

In some example embodiments, the electromagnetic radiation source 257 may comprise an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their mobile device 201 to the host computer system via a USB cable or Bluetooth® connection, traffic that was destined for wireless network 104 is automatically routed to mobile device 201 using the USB cable or Bluetooth® connection. Similarly, any traffic destined for wireless network 104 is automatically sent over the USB cable Bluetooth® connection to the host computer system for processing.

Mobile device 201 may also include a battery 238 as a power source, which is typically one or more rechargeable batteries that may be charged for example, through charging circuitry coupled to a battery interface 236 such as the data port 252. The battery 238 provides electrical power to at least some of the electrical circuitry in mobile device 201, and the battery interface 236 provides a mechanical and electrical connection for the battery 238. The battery interface 236 is coupled to a regulator (not shown) which provides a regulated voltage V to the circuitry for powering mobile device 201.

Mobile device 201 includes a short-range communication subsystem 262 which provides for wireless communication between mobile device 201 and other mobile devices 201. The short-range communication subsystem 262 may be used to provide a device mode between mobile device 201 and another mobile device 201 which may, in at least some example embodiments, be a mobile device which is the same or similar to mobile device 201 discussed with reference to FIG. 1. In at least some example embodiments, the short-range communication subsystem 262 comprises a wireless bus protocol compliant communication mechanism such as a Bluetooth® communication module to provide for communication with similarly-enabled systems and devices.

Mobile device 201 stores data 227 in an erasable persistent memory, which in one example embodiment comprises the flash memory 244. In various example embodiments, the data 227 includes service data including information required by mobile device 201 to establish and maintain communication with wireless network 104. The data 227 may also include user application data such as email messages, address book and contact information, calendar and schedule information, notepad documents, image files, and other commonly stored user information stored on mobile device 201 by its user, and other data. The data 227 stored in the persistent memory (e.g. flash memory 244) of mobile device 201 may be organized, at least partially, into one or more databases or data stores. The databases or data stores may contain data items of the same data type or associated with the same application. For example, email messages, contact records, and task items may be stored in individual databases within the device memory.

Mobile device 201 may, in some example embodiments, comprise a mobile communication device which may provide one or more principal modes of communication, e.g., a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of mobile device 201 may also compose data items, such as email messages; for example, using the input devices in conjunction with the display 204. These composed items may be transmitted through the communication subsystem 211 over wireless network 104.

In the voice communication mode, mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on mobile device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as device mode module 260. In the example embodiment of FIG. 1, the device mode module 260 is implemented as a stand-alone application 225. However, in other example embodiments, the device mode module 260 could be implemented as part of the operating system 223 or another application 225.

The software applications 225 on mobile device 201 may also include a range of additional applications, including for example, a notepad application, Internet browser application, voice communication (i.e. telephony) applications, mapping applications, navigation applications, gaming applications, social networking applications, shopping applications, banking applications, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A set of applications that control basic device operations, including data and possibly voice communication applications will normally be installed on mobile device 201 during or after manufacture. Additional applications and/or upgrades to the operating system 223 or software applications 225 may also be loaded onto mobile device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device. Referring now to FIG. 3A, a front view of an example mobile device 201 comprising a smartphone 350 is illustrated. The smartphone 350 generally comprises a mobile phone which offers more advanced computing capability than a basic non-smartphone cellular phone. For example, the smartphone 350 may have the ability to execute third party applications which are stored on the smartphone.

The smartphone 350 may include the components discussed above with reference to FIG. 2 or a subset of those components. The smartphone 350 includes a housing 294 which houses at least some of the components discussed above with reference to FIG. 2.

In the example embodiment illustrated, the smartphone includes a display 204, which may comprise a touchscreen display which acts as an input interface 206. The display 204 is disposed within the smartphone 350 so that it is viewable at a front side 292 of the smartphone 350. That is, a viewable side of the display 204 is disposed on the front side 292 of the smartphone. In the example embodiment illustrated, the display 204 is framed by the housing 294.

The example smartphone 350 may also include other input interfaces 206 such as one or more buttons, keys or navigational input mechanisms. In the example illustrated, at least some of these additional input interfaces 206 are disposed for actuation at the front side 292 of the smartphone.

The example smartphone may also include one or more speakers 256. In the example embodiment illustrated, the smartphone includes a single speaker 256 which is disposed vertically above the display 204 when the smartphone 350 is held in a portrait orientation where its height is longer than its width. The speaker 256 may be disposed on the front face of the smartphone 350.

While the example smartphone 350 of FIG. 3A includes a single speaker 256, in other example embodiments, the smartphone 350 may include a greater number of speakers 256. For example, in at least some example embodiments, the smartphone 350 may include a second speaker 256 which is disposed vertically below the display 204 when the smartphone is held in a portrait orientation where its height is longer than its width (i.e. the orientation illustrated in 3A).

The example smartphone 350 may also include a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 350 may also include a front facing camera 253 which may be located vertically above the display 204 when the smartphone 350 is held in a portrait orientation where its height is longer than its width. The front facing camera 253 is located so that it may capture images of objects which are located in front of and/or surrounding the front side of the smartphone 350.

The example smartphone 350 may also include an electromagnetic radiation source 257. The electromagnetic radiation source 257 is disposed on the front side 292 of the smartphone 350. In this orientation, electromagnetic radiation which is produced by the electromagnetic radiation source 257 may be projected onto objects which are located in front of and/or surrounding the front side of the smartphone 350. Such electromagnetic radiation (or the projection of electromagnetic radiation onto objects) may be captured on images obtained by the camera 253.

Figure 3:
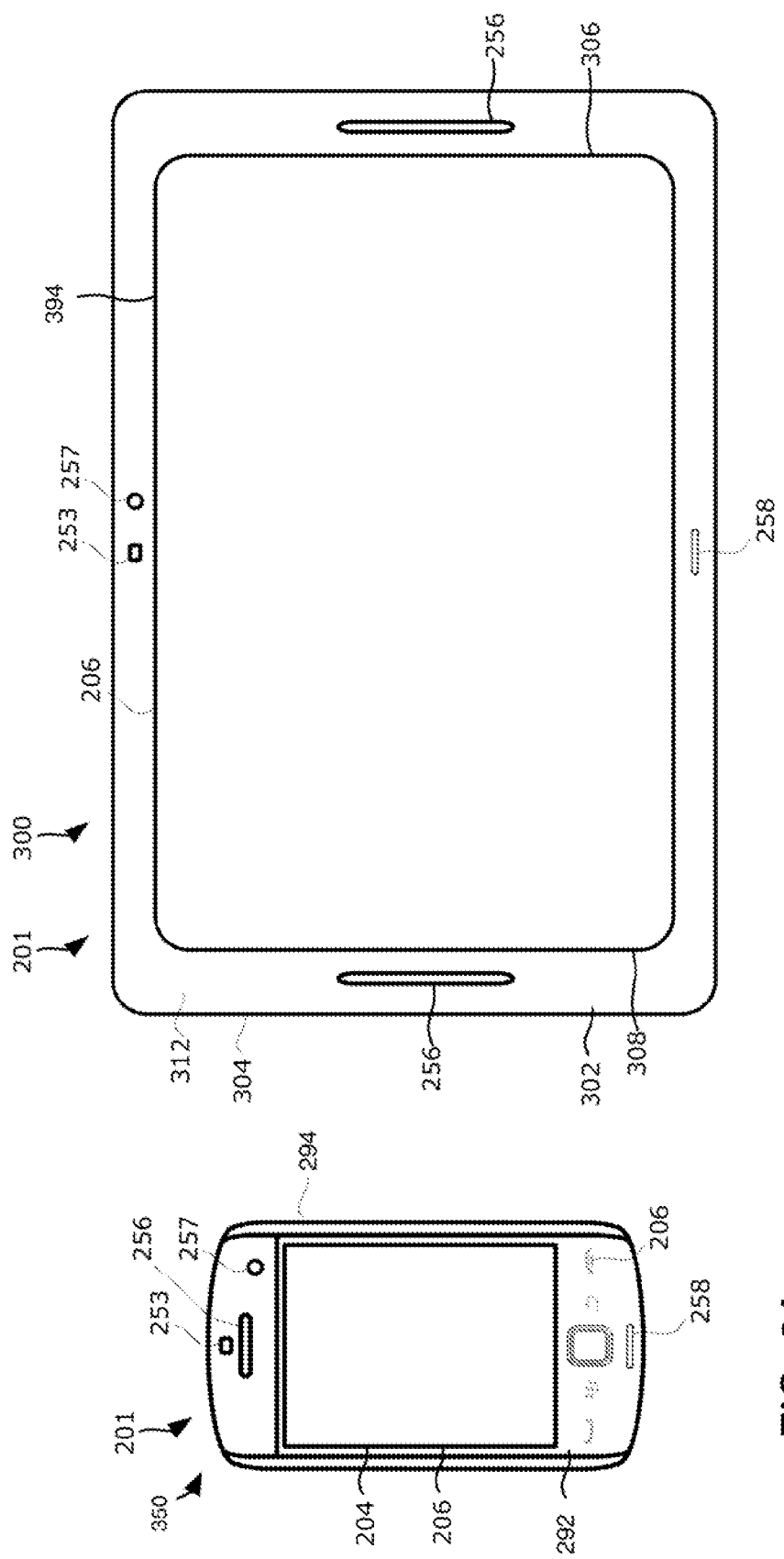
FIGS. 3A and 3B are some examples of different types of mobile devices of the present disclosure, which include a smartphone (FIG. 3A) and a tablet computer (FIG. 3B)

Example Tablet Electronic Device. The mobile device may comprise a tablet computer 300 "tablet"), one of which is illustrated in FIG. 3B. Tablet computer 300 of FIG. 3B may include many of the same features and components of the smartphone 350 of FIG. 3A. However, tablet computer 300 of FIG. 3 is generally larger than the smartphone 350 of FIG. 3A. Tablet computer 300 may include the components discussed above with reference to FIG. 2 or a subset of those components. Tablet computer 300 includes a housing 394 which houses at least some of the components discussed above with reference to FIG. 2.

Tablet computer 300 includes a display 304, which may comprise a touchscreen display which acts as an input interface 206. The display 304 is disposed within tablet computer 300 so that it is viewable at a front side 302 of tablet computer 300. That is, a viewable side of the display 304 is disposed on the front side 302 of tablet computer 300. In the example embodiment illustrated, the display 304 is framed by the housing 394, with use of a frame 312 which surrounds the display 304. The frame 312 is portion of the housing 394 which provides a border around the display 304. In at least some example embodiments, the frame 312 is an active frame 312. That is, the frame has a touch sensitive overlay which allows mobile device 201 to detect a touch applied to the frame, thereby allowing the frame 312 to act as an input interface 206 (of FIG. 1).

The example tablet computer 300 may include one or more speakers 256. In the example embodiment illustrated, the tablet includes two speakers 256. The two speakers 256 are disposed on opposing sides of the display 304. More particularly, when tablet computer 300 is held in a landscape orientation (such as the orientation illustrated in FIG. 3A) where its width is longer than its height, one of the two speakers is disposed on a right side 306 of the display 304 and one of the speakers is disposed on the left side 308 of the display 304. Both speakers 256 are disposed on the front side 302 of tablet computer 300.

The example tablet computer 300 may also include a microphone 258. In the example illustrated, the microphone 258 is vertically disposed below the display 304 when the tablet computer is held in the landscape orientation illustrated in FIG. 3B. The microphone 258 may be located in other locations in other example embodiments.

The example tablet computer 300 may also include a front facing camera 253 which may be located vertically above the display 304 when tablet computer 300 is held in a landscape orientation (i.e. the orientation of FIG. 3A). The front facing camera 253 is located so that it may capture images of objects which are located in front of and/or surrounding the front side of tablet computer 300.

The example tablet computer 300 may also include an electromagnetic radiation source 257. The electromagnetic radiation source 257 is disposed on the front side 304 of tablet computer 300. In this orientation, electromagnetic radiation which is produced by the electromagnetic radiation source 257 may be projected onto objects which are located in front of and/or surrounding the front side 302 of tablet computer 300. Such electromagnetic radiation (or the projection of electromagnetic radiation onto objects) may be captured on images obtained by the camera 253.

Although a specific mobile device 201 has just been described, any suitable wireless communication device or terminal may be part of the methods and apparatus which will be described in fuller detail below. Also, although the description of the architecture relates to a specific example for illustration, where the wireless network or WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

As described in the Background section, mobile device 201 as described may utilize a number of different data applications, each of which may require different credentials for access. As a user may own or operate more than one of these mobile devices 201, it would be useful to be able to securely and reliably transfer such credentials between multiple mobile devices. Securely retaining credentials only in the mobile devices, without storing them off the devices in unencrypted form, is useful.

Figure 4:
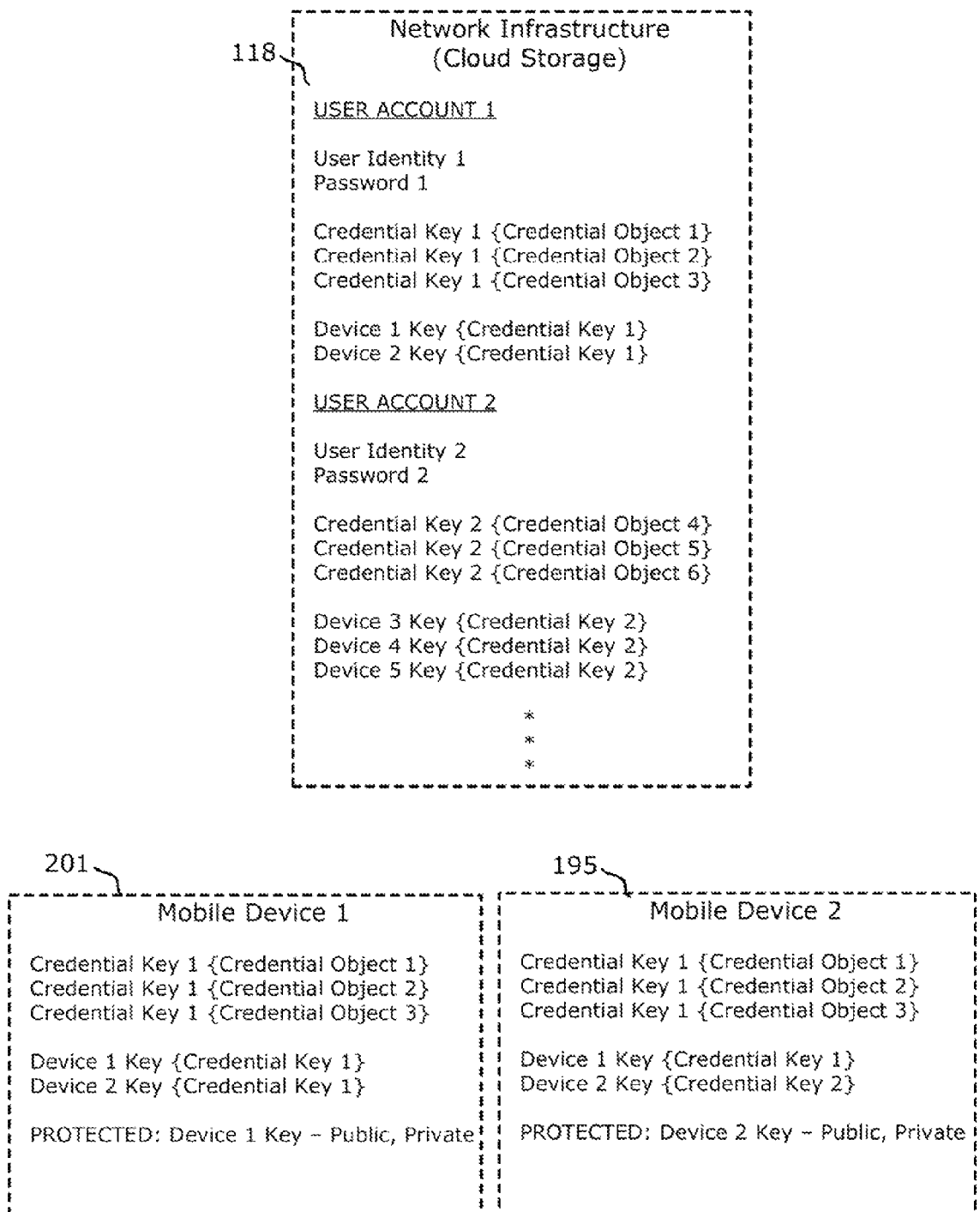
FIG. 4 is an illustrative representation of a network infrastructure (e.g. a cloud or remote storage) for storing and/or sharing a plurality of credential objects of a user account amongst a plurality of mobile devices operative in a wireless network.

FIG. 4 is an illustrative representation of network infrastructure 118 (e.g. a cloud or remote storage) for storing and/or sharing a plurality of credential objects of a user account amongst a plurality of mobile devices (e.g. mobile devices 201 and 195) operative in a wireless network. Each user account (e.g. "USER ACCOUNT 1") includes user authorization credentials for mobile device access to the credentials stored in network infrastructure 118. The user authorization credentials may be or include, for example, a user identity and associated password (e.g. "User Identity 1" and "Password 1" for "USER ACCOUNT 1", and "User Identity 2" and "Password 2" for "USER ACCOUNT 2").

Network infrastructure 118 stores encrypted credential objects in association with the user account, where each credential object is encrypted with a credential key (e.g. For "USER ACCOUNT 1": "Credential Key 1 {Credential Object 1}", "Credential Key 1 {Credential Object 2}", "Credential Key 1 {Credential Object 3}") (e.g. For "USER ACCOUNT 2": "Credential Key 2 {Credential Object 4}", "Credential Key 2 {Credential Object 5}", "Credential Key 2 {Credential Object 6}"). Network infrastructure 118 also stores a plurality of encrypted forms of the credential key in association with the user account, where each encrypted form of the credential key is encrypted with one of a plurality of device keys (e.g. for "USER ACCOUNT 1": "Device 1 Key {Credential Key 1}" for mobile device 201 and "Device 2 Key {Credential Key 1}" for mobile device 195) (e.g. for "USER ACCOUNT 2": "Device 3 Key {Credential Key 2}", "Device 4 Key {Credential Key 2}", "Device 5 Key {Credential Key 2}").

Mobile device 201 and mobile device 195 are associated with "USER ACCOUNT 1". Each mobile device 202 and 195 stores the encrypted credential objects, were each credential object is encrypted with the credential key (e.g. "Credential Key 1 {Credential Object 1}", "Credential Key 1 {Credential Object 2}", "Credential Key 1 {Credential Object 3}". Each mobile device 202 and 195 also stores the plurality of encrypted forms of the credential key, where each encrypted form of the credential key is encrypted with one of a plurality of device keys (e.g. "Device 1 Key {Credential Key 1}" for mobile device 201, and "Device 2 Key {Credential Key 1}" for mobile device 195). Finally, each mobile device 202 and 195 also stores its own device key. For example, mobile device 202 stores its "Device 1 Key" in memory (e.g. in protected space), and mobile device 195 stores its "Device 2 Key" in memory (e.g. in protected space).

Figure 5:
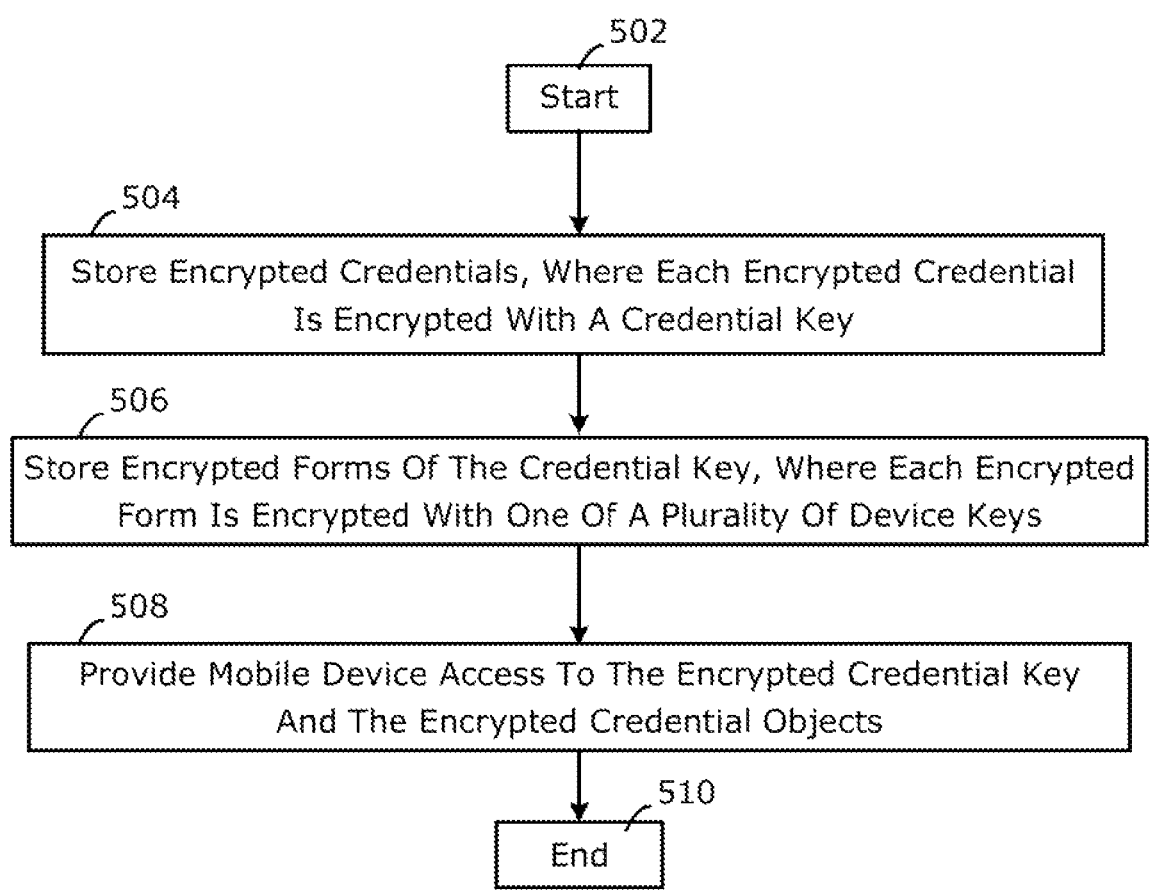
FIG. 5 is a flowchart for a method for use in sharing a plurality of credential objects of a user account amongst a plurality of mobile devices operative in a wireless network.

FIG. 5 is a flowchart for a method for use in sharing a plurality of credential objects of a user account amongst a plurality of mobile devices operative in a wireless network. The method of FIG. 5 may be performed by the network infrastructure (e.g. a cloud or remote storage) in the environments described above (see e.g. FIG. 4). More particularly, the techniques described in relation to the flowchart of FIG. 5 may be performed by one or more servers, controllers, or processors of the network infrastructure. A computer program product which may embody the technique may include a computer readable medium (e.g. memory, computer disk, CD-ROM, etc.) having computer instructions stored therein which are executable by the one or more processors of the network infrastructure for performing the technique. The method may be performed for each one of a plurality of different user accounts, where each user account is associated with a plurality of different mobile devices.

Beginning at a start block 502 of FIG. 5, the network infrastructure stores in its memory a plurality of encrypted credential objects in association with the user account (step 504 of FIG. 5). A credential object may be or include, for example, a user identifier and password associated with an application (e.g. credentials for social networking applications such as Facebook, Twitter, etc.), or identifications of applications having confirmed purchases. In some embodiments, the credential object may include other authentication tokens in addition to or instead of a password.

Each encrypted credential object is encrypted in accordance with a credential key. In one example, the credential key is a symmetric encryption key which is generated by (an initial) one of the mobile devices. The credential key is not stored in the network infrastructure in unencrypted form.

The network infrastructure also stores in its memory a plurality of encrypted forms of the credential key in association with the user account (step 506 of FIG. 5). Each encrypted form of the credential key is encrypted with one of a plurality of device keys. Each device key is associated with and stored at one of the mobile devices that generates it. Each device key is different from every other device key, and each encrypted form of the credential key is different from every other encrypted form of the credential key. The device key may be an asymmetric encryption key. The asymmetric encryption key may include a public key and a private key, and the private key will not (e.g. never) be communicated from the mobile device to maintain security. The device keys are not stored in the network infrastructure.

The network infrastructure provides to the mobile devices access to the encrypted credential objects and the encrypted credential key (step 508 of FIG. 5). A mobile device may receive at least one of the encrypted forms of the credential key and decrypt it with use of its stored device key, for producing the credential key. The mobile device may then subsequently receive the encrypted credential objects and decrypt them with use of the credential key. In order to obtain such access, the mobile device may submit authentication credentials (e.g. a user identifier and password) to the network infrastructure. If positively verified, the mobile device is allowed access as described. The flowchart of FIG. 5 ends at an end block 510.

FIG. 6 is a flowchart for a method for use in initially establishing a shared use of a plurality of credential objects of a user account amongst one or more mobile devices operative in a wireless network. This method of FIG. 6 may be included with the method of FIG. 5 for initially establishing the shared use. The method of FIG. 6 may be performed by a (master or "source") mobile device in the environments described above. More particularly, the techniques described in relation to the flowchart of FIG. 6 may be performed by one or more controllers or processors of the master or source mobile devices. A computer program product which may embody the technique may include a computer readable medium (e.g. memory, computer disk, CD-ROM, etc.) having computer instructions stored therein which are executable by the one or more processors of the mobile device for performing the technique.

The method of FIG. 6 may make use of a network infrastructure (e.g. a cloud or remote storage) which is configured to store a plurality of encrypted credential objects in association with a user account for a user. Each encrypted credential object is encrypted in accordance with a credential key. The credential key may be a symmetric encryption key. The network infrastructure is also configured to store a plurality of encrypted forms of the credential key in association with the user account. Each encrypted form of the credential key is encrypted with one of a plurality of device keys. Each device key is stored at one of the mobile devices. The device key may be an asymmetric encryption key.

In order to initially establish a user account, the (first) mobile device may submit a request to the network infrastructure and establish authentication credentials (e.g. a user identifier and password). If the mobile device is properly authorized, a procedure for initially establishing the user account is performed.

Beginning at a start block 602 of FIG. 6, a mobile device produces a credential key (step 604 of FIG. 6). In one example, the credential key is a symmetric encryption key. This credential key is not (or never) stored in the network infrastructure in unencrypted form. The mobile device also produces a device key (step 606 of FIG. 6). The device key may be an asymmetric encryption key. The device key is stored in memory of the mobile device (e.g. in protected space). The mobile device is not authorized to send, and does not send, a private key of the asymmetric encryption key from the device.

The credential objects will be encrypted with the credential key for producing encrypted credential objects (step 608 of FIG. 6). The encrypted credential objects are stored in memory of the mobile device, and are also sent to the network infrastructure for storage in association with the user account. The mobile device also encrypts the credential key with the device key (step 610 of FIG. 6). The mobile device sends the encrypted credential key for storage in association with the user account (FIG. 612 of FIG. 6).

Subsequently, the mobile device may receive an encrypted credential key, decrypt the encrypted credential key with its device key for producing the credential key, and then decrypt at least one of the encrypted credential objects with the credential key.

One or more additional mobile devices (e.g. a second mobile device) may be added to the user account or for sharing of the credentials amongst multiple mobile devices. When such additional mobile device attempts to obtain access, submitting authentication credentials (e.g. user identifier and password) to the network infrastructure, this triggers a key exchange process with the first or "master" mobile device.

FIG. 7 is a flowchart for a method in a target mobile device for obtaining a credential key from a source mobile device, and correspondingly a method in a source mobile device for communicating a credential key to a target mobile device. This method may be for use in sharing a plurality of credential objects of a user account amongst one or more other mobile devices operative in the wireless network. This method of FIG. 7 may be included with the method of FIG. 6 for adding on mobile devices (e.g. a second, third, fourth, etc.) for sharing the credentials amongst them.

Again, the method of FIG. 7 may be performed by two mobile devices in the environments described above. One of the mobile devices may be deemed a master or source device, and the other device a slave or target device. A left column in the flowchart indicates actions which are taken by the target or slave device, whereas a right hand column in the flowchart indicates actions which are taken by the source or master device. More particularly, the techniques described in relation to the flowchart of FIG. 7 may be performed by one or more controllers or processors of the mobile device. A computer program product which may embody the technique may include a computer readable medium (e.g. memory, computer disk, CD-ROM, etc.) having computer instructions stored therein which are executable by the one or more processors of the mobile device for performing the technique.

The method of FIG. 7 may make use of a network infrastructure (e.g. a cloud or remote storage; see e.g. the discussion in relation to FIGS. 4 and 5) which stores a plurality of encrypted credential objects in association with a user account. Each encrypted credential object is encrypted in accordance with a credential key. The credential key may be a symmetric encryption key. The network infrastructure also stores one or more encrypted forms of the credential key in association with the user account. Each encrypted form of the credential key is encrypted with one of a plurality of device keys. Each device key is stored at one of the mobile devices.

In particular, the source mobile device which is identified by a source identifier (e.g. a Personal Identification Number or "PIN" of the source mobile device) stores, in its memory, a source device key. The source device key may be an asymmetric encryption key. A first encrypted form of the credential key is stored in association with the user account, and the first encrypted form of the credential key is encrypted with the source device key.

The method of FIG. 7 is initiated in response to an indication that the target mobile device is to be included as an authorized device for the user account, for obtaining access to the stored credentials in the network infrastructure. A user of the target mobile device submits authentication credentials (e.g. user identifier and password) to the network infrastructure. If positively verified, the target mobile device proceeds to perform a key exchange process with the source mobile device. For this purpose, the target mobile device produces a target device key. The target device key may be randomly generated, and may further be an asymmetric encryption key.

Beginning at a start block 702 of FIG. 7, the target mobile device produces a request message for the key exchange (step 704 of FIG. 7). The request message may include the user identity of the user account, a target identifier which identifies the target mobile device (e.g. a Personal Identification Number or "PIN" of the target mobile device), and the target device key of the target mobile device. The request message may also include a salt. A salt may generally be viewed as a plurality of random bits, creating one of the inputs to a one-way function. The target mobile device signs the request message with a digital signature (step 706 of FIG. 7). The target mobile device sends the signed request message to the source mobile device (step 708 of FIG. 7).

In some embodiments, the request message is sent to the source mobile device via the wireless network through the network infrastructure. In other embodiments, the request message is sent directly to the source mobile device over a short range wireless link (e.g. a Bluetooth wireless link, or a Wi-Fi Peer-to-Peer (P2P) wireless link, or a NFC link, etc.).

The source mobile device receives the request message for the key exchange (step 710 of FIG. 7). Again, the request message includes the target identifier which identifies the target mobile device and the target device key of the target mobile device. The request message may also include the user identity of the user account. The source mobile device verifies the digital signature of the request message (step 712 of FIG. 7).

If the request message is not positively verified in step 712, then the process is aborted. On the other hand, if the request message is positively verified in step 712, the source mobile device sends a response message to the target mobile device (step 714 of FIG. 7). The response message may include the user identity of the user account, the target identifier, and a second encrypted form of the credential key. The second encrypted form of the credential key is encrypted with the target device key. The response message may also include a salt of the source mobile device. The source mobile device may also sign the response message with a new digital signature.

The target mobile device receives the response message from the source device (step 716 of FIG. 7). The response message includes the user identity of the user account, the target identifier, and the second encrypted form of the credential key, being encrypted with the target device key. If the response message is not positively verified, then the process is aborted. On the other hand, if the response message is positively verified, the target mobile device continues further processing.

Namely, the target mobile device is able to decrypt the encrypted form of the credential key for producing the credential key. The target mobile device may then receive the encrypted credential objects and decrypt them with the credential key.

Advantageously, as a user may own or operate more than one mobile device, the techniques provided herein assist in securely and reliably transferring such credentials between multiple mobile devices. The credentials are securely kept on the mobile devices, without storing them off the devices in unencrypted form.

Thus, techniques for use in sharing a plurality of credential objects of a user account amongst a plurality of mobile devices operative in a wireless network have been described herein. A network infrastructure stores a plurality of encrypted credential objects in association with the user account. Each encrypted credential object is encrypted with a credential key. The network infrastructure also stores a plurality of encrypted forms of the credential key in association with the user account. Each encrypted form of the credential key is encrypted with a respective one of a plurality of device keys. Each device key is stored at a respective one of the mobile devices. The network infrastructure provides to the mobile devices access to the encrypted credential key and the encrypted credential objects. Each mobile device decrypts one of the encrypted forms of the credential key with a stored device key, so that the mobile device may decrypt the encrypted credential objects with the credential key.

For initially establishing such a shared credentials environment, a mobile device may operate as follows. The mobile device generates the credential key associated with the user account, which is utilized to encrypt the credential objects. The mobile device also generates a device key. The mobile device encrypts the credential key with its device key. The mobile device may send the encrypted credential key for storage in association with the user account.

An additional mobile device may be added on for sharing such credentials. A target mobile device produces a request message for a key exchange, where the request message includes a target identifier which identifies the target mobile device and a target device key generated by the target mobile device. The target mobile device signs the request message with a digital signature. The target mobile device sends the signed request message to a source mobile device. If the request message is positively verified, the target mobile device receives a response message from the source mobile device. The response message includes the target identifier and an encrypted form of the credential key. The encrypted form of the credential key is encrypted with the target device key. The target mobile device is then able to decrypt the encrypted form of the credential key with the target device key for producing the credential key, and then receive and decrypt the credential objects with the credential key.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e. IEEE 802.16), or an Ultra-WideBand (UWB) network (i.e. IEEE 802.15). The invention described herein in the recited claims intends to cover and embrace all suitable changes in technology.

What is claimed is:

1. A method in a target mobile device for obtaining a credential key associated with a user account from a source mobile device, the method comprising:
   producing, by the target mobile device, a request message for a key exchange, the request message including a target identifier and a target device key of the target mobile device, the target mobile device and the source mobile device each associated with the user account, the source mobile device being identified by a source identifier;
   signing, by the target mobile device, the request message with a digital signature;
   sending, by the target mobile device, the signed request message to the source mobile device;
   when the request message is positively verified, receiving, by the target mobile device, a response message from the source mobile device, the response message including the target identifier and an encrypted form of the credential key, the encrypted form of the credential key being encrypted with the target device key;
   decrypting, by the target mobile device, the encrypted form of the credential key;
   retrieving, by the target mobile device, a plurality of encrypted credential objects from a network infrastructure, each of the plurality of encrypted credential objects comprising a respective authentication token;
   decrypting, by the target mobile device, the plurality of encrypted credential objects using the credential key; and,
   using, by the target mobile device, resulting authentication tokens to access respective data applications.

2. The method of claim 1, further comprising:
   decrypting the encrypted form of the credential key with the target device key, for producing the credential key.

3. The method of claim 1, wherein the target device key comprises an asymmetric encryption key.

4. The method of claim 3, further comprising:
   refraining from sending a private key of the target device key from the target mobile device.

5. The method of claim 1, wherein the signed request message to the source mobile device is sent via a wireless network or directly via a short range wireless link.

6. A non-transitory computer readable storage medium, comprising:
   a computer readable medium;
   computer instructions stored in the computer readable medium;
   the computer instructions being executable by one or more processors of a target mobile device for obtaining a credential key associated with a user account from a source mobile device, the source mobile device being identified by a source identifier, the computer instructions being further executable for:
   producing a request message for a key exchange, the request message including a target identifier and a target device key of the target mobile device, the target mobile device and the source mobile device each associated with the user account;
   signing the request message with a digital signature;
   sending the signed request message to the source mobile device; and
   when the request message is positively verified, receiving a response message from the source mobile device, the response message including the target identifier and an encrypted form of the credential key, the encrypted form of the credential key being encrypted with the target device key decrypting the encrypted form of the credential key;

retrieving a plurality of encrypted credential objects from a network infrastructure, each of the plurality of encrypted credential objects comprising a respective authentication token;

decrypting the plurality of encrypted credential objects using the credential key; and, using resulting authentication tokens to access respective data applications.

7. The non-transitory computer readable storage medium of claim 6, wherein the method further comprises:

decrypting the encrypted form of the credential key with the target device key, for producing the credential key.

8. The non-transitory computer readable storage medium of claim 6, wherein the target device key comprises an asymmetric encryption key.

9. The non-transitory computer readable storage medium of claim 8, further comprising:

refraining from sending a private key of the target device key from the target mobile device.

10. The non-transitory computer readable storage medium of claim 6, wherein the signed request message to the source mobile device is sent via a wireless network or directly via a short range wireless link.

11. A target mobile device configured to obtain a credential key associated with a user account from a source mobile device, the target mobile device comprising:

one or more hardware processors;

a radio frequency (RF) transceiver coupled to the one or more hardware processors;

the one or more hardware processors being configured for:

producing a request message for a key exchange, the request message including a target identifier and a target device key of the target mobile device, the target mobile device and the source mobile device each associated with the user account, the source mobile device being identified by a source identifier;

signing the request message with a digital signature;

sending the signed request message to the source mobile device; and when the request message is positively verified, receiving a response message from the source mobile device, the response message including the target identifier and an encrypted form of the credential key, the encrypted form of the credential key being encrypted with the target device key decrypting the encrypted form of the credential key;

retrieving a plurality of encrypted credential objects from a network infrastructure, each of the plurality of encrypted credential objects comprising a respective authentication token;

decrypting the plurality of encrypted credential objects using the credential key; and, using resulting authentication tokens to respective data applications.

12. A method in a source mobile device for communicating a credential key associated with a user account to a target mobile device, the method comprising:

receiving, by the source mobile device, a request message for a key exchange, the request message including a target identifier and a target device key of the target mobile device, the target mobile device and the source mobile device each associated with the user account, the source mobile device being identified by a source identifier;

verifying, by the source mobile device, a digital signature of the request message;

when the request message is positively verified, sending, from the source mobile device a response message to the target mobile device, the response message including the target identifier and an encrypted form of the credential key, the encrypted form of the credential key being encrypted with the target device key so that the target mobile device: decrypts the encrypted form of the credential key, retrieves a plurality of encrypted credential objects from a network infrastructure, each of the plurality of encrypted credential objects comprising a respective authentication token, decrypts the plurality of encrypted credential objects using the credential key, and uses resulting authentication tokens to access respective data applications.

13. The method of claim 12, wherein the target device key comprises an asymmetric encryption key.

14. The method of claim 12, wherein the request message to the source mobile device is received via a wireless network or directly via a short range wireless link.

15. A source mobile device configured for communicating a credential key associated with a user account to a target mobile device, the source mobile device comprising:

one or more hardware processors;

a radio frequency (RF) transceiver (RF) coupled to the one or more hardware processors;

the one or more hardware processors being configured for:

receive a request message for a key exchange, the request message including a target identifier and a target device key of the target mobile device, the target mobile device and the source mobile device each associated with the user account, the source mobile device being identified by a source identifier;

verifying a digital signature of the request message;

when the request message is positively verified, sending, from the source mobile device a response message to the target mobile device, the response message including the target identifier and an encrypted form of the credential key, the encrypted form of the credential key being encrypted with the target device key so that the target mobile device: decrypts the encrypted form of the credential key, retrieves a plurality of encrypted credential objects from a network infrastructure, each of the plurality of encrypted credential objects comprising a respective authentication token, decrypts the plurality of encrypted credential objects using the credential key, and uses resulting authentication tokens to access respective data applications.

16. A non-transitory computer readable storage medium, comprising:

a computer readable medium;

computer instructions stored in the computer readable medium;

the computer instructions being executable by one or more processors of a source mobile device configured for communicating a credential key associated with a user account to a target mobile device, the source mobile device being identified by a source identifier, the computer instructions being further executable for:

receiving, by the source mobile device, a request message for a key exchange, the request message including a target identifier and a target device key of the target mobile device, the target mobile device and the source mobile device each associated with the user account;

verifying, by the source mobile device, a digital signature of the request message;

when the request message is positively verified, sending, from the source mobile device a response message to the target mobile device, the response message including the target identifier and an encrypted form of the credential key, the encrypted form of the credential key being encrypted with the target device key so that the target mobile device: decrypts the encrypted form of the credential key, retrieves a plurality of encrypted credential objects from a network infrastructure, each of the plurality of encrypted credential objects comprising a respective authentication token, decrypts the plurality of encrypted credential objects using the credential key, and uses resulting authentication tokens to access respective data applications.

* * * * *

UNITED STATES PATENT AND TRADEMARK OFFICE
CERTIFICATE OF CORRECTION

| | | |
|---|---|---|
| PATENT NO. | : 8,977,856 B2 | Page 1 of 1 |
| APPLICATION NO. | : 13/601471 | |
| DATED | : March 10, 2015 | |
| INVENTOR(S) | : Edwin J. Feener et al. | |

It is certified that error appears in the above-identified patent and that said Letters Patent is hereby corrected as shown below:

In the Claims

Column 19, line 3, Claim 6, "device key" should read --device key;--.

Column 19, line 51, Claim 11, "device key" should read --device key;--.

Column 20, line 30, Claim 15, "a radio frequency (RF) transceiver (RF) coupled to the one" should read --a radio frequency (RF) transceiver coupled to the one--.

Column 20, line 33, Claim 15, "receive" should read --receiving--.

Signed and Sealed this
Eighth Day of December, 2015

Michelle K. Lee
*Director of the United States Patent and Trademark Office*